(12) United States Patent
Kimura et al.

(10) Patent No.: US 8,844,858 B2
(45) Date of Patent: Sep. 30, 2014

(54) WIRE WINDING DEVICE

(75) Inventors: Koichi Kimura, Saitama (JP); Takuro Kugimiya, Saitama (JP); Masahito Kakema, Utsunomiya (JP); Mamoru Sasaki, Tochigi-ken (JP); Junko Tanaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 840 days.

(21) Appl. No.: 13/000,335

(22) PCT Filed: Jun. 1, 2009

(86) PCT No.: PCT/JP2009/059948
§ 371 (c)(1),
(2), (4) Date: Dec. 20, 2010

(87) PCT Pub. No.: WO2009/157272
PCT Pub. Date: Dec. 30, 2009

(65) Prior Publication Data
US 2011/0114781 A1 May 19, 2011

(30) Foreign Application Priority Data

Jun. 27, 2008 (JP) ................................. 2008-168503

(51) Int. Cl.
| | | |
|---|---|---|
| *B65H 39/16* | (2006.01) | |
| *H01F 41/06* | (2006.01) | |
| *B65H 59/12* | (2006.01) | |
| *H02K 15/04* | (2006.01) | |
| *H02K 3/52* | (2006.01) | |
| *B65H 59/38* | (2006.01) | |
| *H02K 15/095* | (2006.01) | |

(52) U.S. Cl.
CPC .......... *H02K 15/095* (2013.01); *H01F 41/0612* (2013.01); *B65H 59/12* (2013.01); *H02K 15/0457* (2013.01); *H02K 3/522* (2013.01); *B65H 59/384* (2013.01)

USPC ....................................... 242/444.1; 242/443

(58) Field of Classification Search
CPC ...... B65H 59/00; B65H 59/12; B65H 59/382; B65H 59/384; B65H 59/385; B65H 59/387; H01F 41/0612; H02K 15/0435
USPC ................. 242/433, 433.2, 433.3, 443–444.1
See application file for complete search history.

(56) References Cited

U.S. PATENT DOCUMENTS

| | | | | |
|---|---|---|---|---|
| 4,141,515 A | * | 2/1979 | Lock et al. | ................. 242/523.1 |
| 6,216,513 B1 | * | 4/2001 | Nakamura et al. | .............. 72/148 |

FOREIGN PATENT DOCUMENTS

| | | |
|---|---|---|
| EP | 0 926 090 A2 | 6/1999 |
| JP | 54-93451 A | 7/1979 |
| JP | 56-126534 A | 10/1981 |
| JP | 4-292379 A | 10/1992 |
| JP | 11-222357 A | 8/1999 |
| JP | 2004-104022 A | 4/2004 |

* cited by examiner

*Primary Examiner* — Emmanuel M Marcelo
*Assistant Examiner* — Angela Caligiuri
(74) *Attorney, Agent, or Firm* — Rankin, Hill & Clark LLP

(57) ABSTRACT

A wire winding device which uses a large-sized supply bobbin, which has a large capacity and a large diameter, to highly precisely suppress a variation in tension which variation occurs when a coil is formed by winding a wire material at high speed with the wire material aligned with a winding frame. Rotation (the number of rotation, and timing) of the supply bobbin relative to rotation of the coil is controlled based on the difference between the amount of take-up of the wire material taken up on the winding frame side and the amount of pay-out of the wire material paid out from the supply bobbin, and the control is performed such that the amount of the take-up and the amount of the pay-out agree with each other every moment. This can highly precisely suppress a variation in tension even if there are large differences between inertia of and the diameters of the coil and the supply bobbin.

6 Claims, 9 Drawing Sheets

[COMPARATIVE EXAMPLE]

WIRE WINDING DEVICE

CROSS-REFERENCED TO RELATED APPLICATION

This application is a National Stage entry of International Application No. PCT/JP2009/059948, filed on Jun. 1, 2009, which claims priority to Japanese Patent Application 2008-168503, filed Jun. 27, 2008. The disclosure of the prior application is herby incorporated in its entirety by reference.

TECHNICAL FIELD

The present invention relates to a wire winding device for producing a coil by winding a wire material, which is supplied from a supply bobbin, on a winding frame while applying tension to the wire material.

BACKGROUND ART

For example, for use in a DC brushless motor, a stator has been adopted, which is constructed by assembling a substantially T-shaped core in an annular form, having an arcuate yoke section and pole sections that extend diametrically to an inner side thereof from the yoke section.

This type of stator is manufactured by clamping and rotating the yoke section of the core about a spindle shaft, and while a wire material, which is supplied from a supply bobbin, is guided by a nozzle, and by being reciprocally operated in an axial direction (spindle shaft direction) of the pole sections (winding frame), a multi-layered winding coil is produced on the pole sections.

Generally, the wire winding device for producing the coil is equipped with a supply bobbin that supplies the wire material, a coil producing section that produces the coil by winding the wire material on the winding frame (core), and a tensioning mechanism arranged between the supply bobbin and the coil producing section for alleviating variations in tension that occur upon winding the wire material on the winding frame.

When the wire material is wound on the winding frame, because the wire material becomes stretched if the tension is too high, or slacking occurs if the tension is too low, it is essential that the tension be maintained at an appropriate value.

As a tensioning mechanism, there has been adopted a mechanism that absorbs tension variations using a spring or a damper, or a mechanism in which the wire material is wound on a brake roller, which adjusts the braking force of the brake roller responsive to a tension that is estimated from the wire material length, or the like.

However, with such a tensioning mechanism using a spring or a damper, because the tension adjustment range is determined arbitrarily by the spring constant, the capability to suppress tension variations is low. On the other hand, with the brake roller mechanism, because the wire material is made to intersect and is trained around the roller multiple times, when the supply bobbin is replaced, time is required for resetting and performing maintenance thereon.

In Japanese Laid-Open Patent Publication No. 11-222357, there is disclosed a wire winding device comprising a spool (wire material source) that feeds out a wire material, a spindle that retains a winding frame on which the wire material is wound, a spindle motor for rotatably driving the spindle, a detecting means for detecting a supply amount of the wire material to the winding frame, and a control means for controlling the feed-out speed of the wire material from the wire material source so that the supply amount of the wire material to the winding frame, which is detected by the detecting means, and the wire material feed-out amount agree with each other.

With the technique disclosed in Japanese Laid-Open Patent Publication No. 11-222357, by means of a feed-out motor arranged at the spool, a tensioning mechanism can be simplified, which alleviates variations in tension by controlling the feed-out amount of the wire material. Even without using a tensioning mechanism such as a brake roller mechanism, variations in tension can be suppressed reliably.

SUMMARY OF INVENTION

In the foregoing manner, in order to improve manufacturing capacity, development of techniques have progressed, by which variations in tension that occur when the wire material is wound on the winding frame are controlled, and the wire material is wound onto the winding frame at a high speed.

Incidentally, in order to improve manufacturability for producing a coil, an improvement is considered in which, by using a large capacity supply bobbin having a large amount of wire material wound thereon, the time required for maintenance (setup time) can be shortened.

However, in the case that a large capacity bobbin is used, tension variations tend to increase, caused by an increase in the inertia and difference in diameter of the supply bobbin and the winding frame (the core, bobbin, wound coil, etc.).

The present invention, taking into consideration these types of problems, has the object of providing a wire winding device, which is capable of controlling with high accuracy variations in tension that occur when a coil is formed by winding a wire material at high speeds while the wire material is arrayed on a winding frame, using a large scale, large capacity and large diameter supply bobbin.

A wire winding device according to the present invention comprises a bobbin rotating mechanism for rotating a supply bobbin that supplies a wire material, a coil rotating mechanism for winding the wire material supplied from the supply bobbin via a nozzle while the wire material is arrayed on a winding frame to thereby produce a coil, and a controller for controlling the rotational speed of the bobbin rotating mechanism and the coil rotating mechanism. The controller comprises a coil rotational speed setting unit for setting a coil rotational speed of a constant velocity, a bobbin rotational speed target value calculating unit for calculating a bobbin rotational speed target value based on the coil rotational speed, the coil diameter and the supply bobbin diameter, a winding take-up amount calculating unit for calculating a winding take-up amount of the wire material that is wound on the winding frame as the coil, from an actual rotational speed of the coil and the coil diameter, a feed-out amount calculating unit for calculating a feed-out amount of the wire material that is fed from the supply bobbin, from an actual rotational speed of the supply bobbin and the bobbin diameter, and timing setting means for setting a timing at which rotation of the bobbin rotating mechanism is started at the bobbin rotational speed target value, based on a feed-out delay time of the supply bobbin, which is calculated from the calculated winding take-up amount and the calculated feed-out amount.

According to the present invention, based on a difference between the winding take-up amount of the wire material, which is taken up on the side of the winding frame, and the feed-out amount of the wire material, which is fed out from the supply bobbin, rotation of the supply bobbin with respect to rotation of the coil is controlled so that the winding take-up amount and the feed-out amount are kept in agreement moment by moment, such that, even if the inertia and diameter of the coil and the supply bobbin differ greatly from each other, variations in tension can be suppressed highly accurately.

For example, the rotational speed of the coil is fixed at a value on the order of 1000 rpm, and the rotational speed of the bobbin is maintained within a range of 1/10 to 1/20 thereof (coil rotational speed>>bobbin rotational speed). According to the present invention, the coil can be produced within a short time while variations in tension are suppressed with high accuracy.

In this case, the controller calculates a bobbin rotational speed target value for each of respective layers, corresponding to a number of layers of the coil that is wound on the winding frame, and sets a timing for starting rotation of the bobbin or for switching the rotational speed for the respective layers. If carried out in this manner, in a regular winding coil, responsive to the winding layers (number of coil layers), because control is performed corresponding to the outer diameter of the coil becoming larger and as the winding take-up amount per each turn of the coil increases, and so that the actual rotational speed of the bobbin becomes greater, variations in tension can be suppressed with higher accuracy.

Further, preferably, a tensioning mechanism is provided over which the wire material is trained, for alleviating variations in tension that occur when the wire material is wound on the winding frame, the tensioning mechanism being disposed in a wire material feed-out path between the supply bobbin and the winding frame. Because the difference between the winding take-up amount of the wire material by the coil (coil take-up amount) and the feed-out amount of the wire material from the bobbin (bobbin feed-out amount) is made small, the displacement amount of the pulley of the tensioning mechanism also becomes small, whereby the tensioning mechanism can be simplified and made smaller in scale. As a result, adoption of a large scale and complex mechanism using a brake roller mechanism for suppressing tension variations is unnecessary, and, for example, only a tensioning mechanism formed by means of a linear tensioner, which is simple in structure, can be utilized.

In this case, in the event that a tensioning mechanism in the form of a linear tensioner is provided, the controller may further comprise a bobbin rotational speed target value correcting unit for calculating a next bobbin rotational speed target value, based on a shift amount in position of the linear tensioner and a total feed-out amount of the wire material at a present time of winding, such that a total feed-out amount error, defined as a deviation between a coil winding take-up amount and a bobbin feed-out amount at a next time of winding, vanishes. As a result, cumulative winding deviations in a single coil can be eliminated.

According to the wire winding device of the present invention, at a large scale, using a large capacity and large diameter supply bobbin, variations in tension that occur when a coil is formed by winding a wire material at high speeds while the wire material is arrayed on a winding frame can be suppressed highly accurately.

Further, because the rotational speed on the side of the coil that takes up the wire material is set as a constant rotational speed, the time required to manufacture the coil can be shortened.

Furthermore, because the mechanism for guiding the wire material from the supply bobbin to the winding frame is simplified, maintainability thereof is improved.

DESCRIPTION OF EMBODIMENTS

An embodiment of the wire winding device according to the present invention shall be presented below and explained with reference to the accompanying FIGS. 1 through 8.

Figure 1:
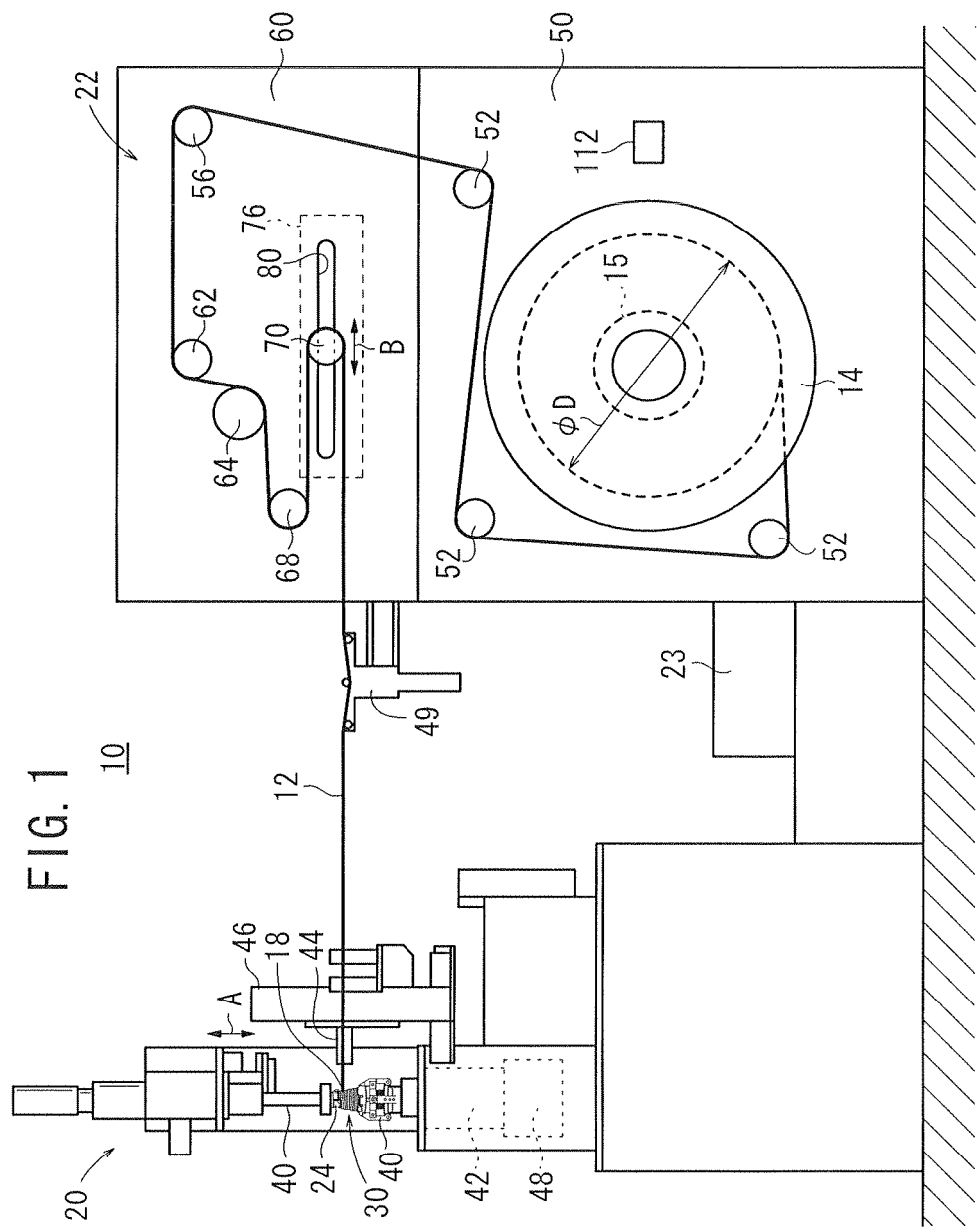
FIG. 1 is a side view of a wire winding device according to an embodiment of the present invention.

As shown in FIG. 1, a wire winding device 10 according to the present embodiment includes a supply bobbin 14 for supplying (feeding out) a wire material 12 (conductive wire) that is wound thereon, a coil producing section 20 for producing a coil 18 by winding the supplied wire material 12 on a winding frame 30, a tensioning mechanism 22 disposed between the supply bobbin 14 and the coil producing section 20 for alleviating variations in tension that occur upon winding of the wire material 12, and a controller 23 for carrying out overall control of the wire winding device 10. The wire material 12 is a copper wire having, for example, an enamel or a polyurethane covering layer.

Figure 2:
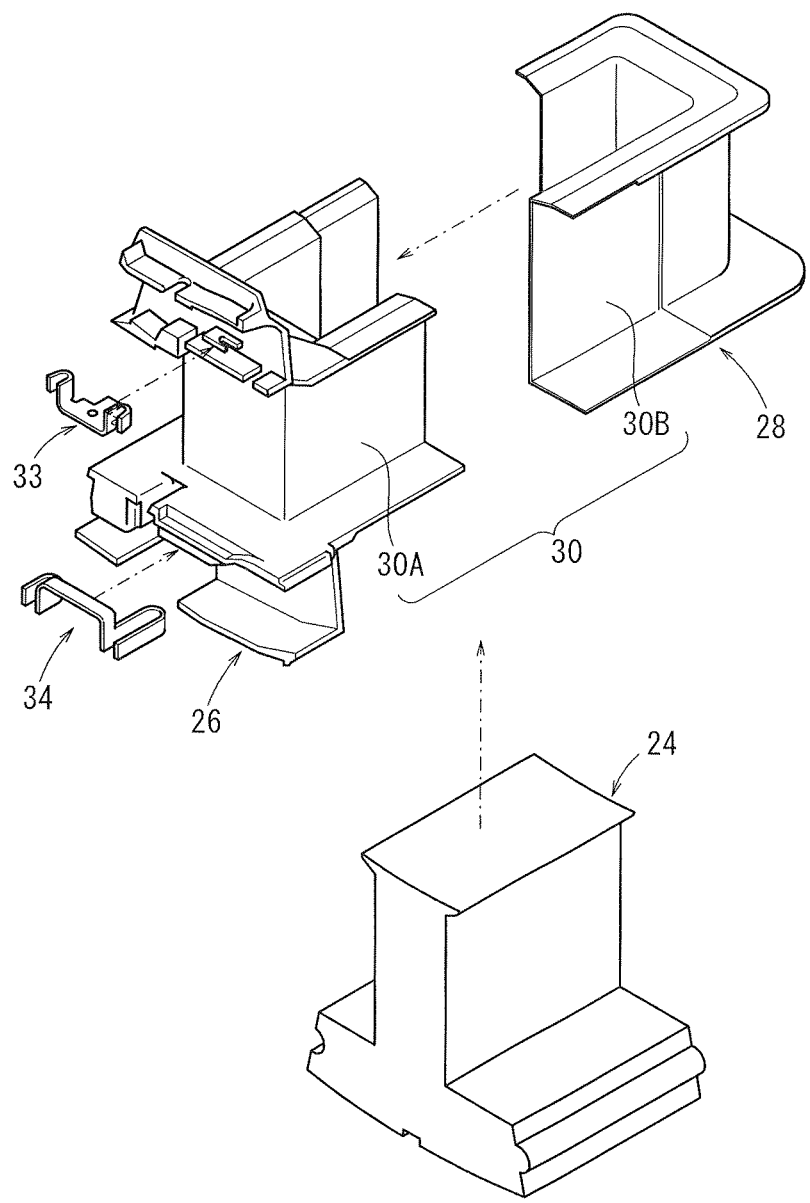
FIG. 2 is an exploded perspective view of a coil.
Figure 3:
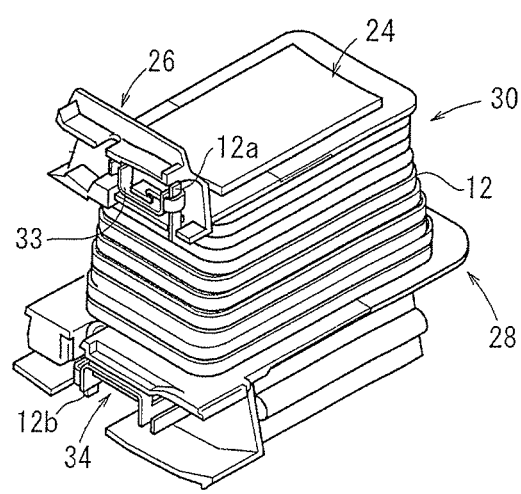
FIG. 3 is a perspective view of the coil.

As shown in FIGS. 2 and 3, the coil 18 includes a stacked steel plate (core) 24 made up from a plurality of roughly T-shaped steel plates, which are punched out by a press and caulked together in an integral manner, insulators 26, 28 that insulate the stacked steel plate 24, the wire material 12, which is wound around the stacked steel plate 24 via the insulators 26, 28, and metallic terminals 33, 34. The insulators 26, 28 are formed, for example, from PPS (polyphenylene sulfide), and include a winding frame (coil winding member) 30 (30A, 30B) over which the wire material 12 is wound. The insulators 26, 28 are joined together by respective overlapping portions thereof, so that the stacked steel plate 24 and the wire material 12 are electrically insulated from each other.

A winding-start end part 12a of the wire material 12 is caulked onto the terminal 33 and cut, thereby fixing the end part 12a to the terminal 33, whereas a winding-finish end part 12b of the wire material 12 is caulked onto the terminal 34 and cut, thereby fixing the end part 12b to the terminal 34.

Returning to FIG. 1, the coil producing section 20 includes a clamp jig 40 for rotatably retaining the stacked steel plate 24 on which the insulators 26, 28 are mounted, a spindle 42 that rotates the clamp jig 40, a nozzle 44 that stabilizes the supply direction of the wire material 12, and an orthogonal shaft robot 46 that adjusts the position in the vertical direction (the direction of arrow A) of the nozzle 44, and arrays the wire material 12 in a plurality of layers. The spindle 42 is supported axially on a motor (spindle motor) 48 (coil rotating mechanism) and is rotated at a constant speed under a rotary action of the spindle motor 48. The orthogonal shaft robot 46 is capable of being operated at high speeds by a linear motor.

A tension measuring unit 49, which measures the tension of the wire material 12, is disposed between the coil producing section 20 and the tensioning mechanism 22. Tension measurements therefrom are supplied in real time to the controller 23.

The supply bobbin 14 is supported axially and disposed in the interior of an openable/closable box 50 for carrying out supply of the wire material 12 through a plurality of compartment interior pulleys 52. The supply bobbin 14 is supported axially on the shaft of a bobbin motor 15 (bobbin rotating mechanism), the rotational speed of which is capable of being adjusted under the control of the controller 23.

The tensioning mechanism 22 is constituted from pulleys 56, 62, 64, 68 and a tension roller 70, respective axes of which are disposed in parallel on a base plate 60 arranged on an upper portion of the box 50, and a linear motor 76 that serves as a linear tensioner disposed on a rear surface of the base plate 60.

The tension roller 70 is connected to the linear motor 76 through a slit 80 that is provided in a horizontal direction on the base plate 60, and is axially supported rotatably by the linear motor 76. The linear motor 76 moves the tension roller 70 horizontally (in the direction of arrow B).

The wire material 12, which is fed out from the box 50, after passing over the pulleys 56, 62, 64, 68 and being trained around the tension roller 70, passes through the nozzle 44 and is drawn out to the coil producing section 20.

As a result of the tension roller 70 being moved horizontally (in the direction of arrow B) by the controller 23 via the linear motor 76, the tension imposed with respect to the wire material 12 is adjusted.

Next, an explanation shall be given concerning a procedure for training the wire material 12 in the wire winding device 10 constructed as described above.

First, the controller 23 drives the linear motor 76 and moves the tension roller 70 horizontally along the slit 80 to a standby position (origin point) at the left end (tension measuring unit 49 side) thereof.

Next, the wire material 12 is pulled out from the supply bobbin 14 and the wire material 12 is trained over the illustrated path with respect to the pulley 56 of the base plate 60 via the compartment interior pulleys 52, 52, 52.

Furthermore, from the pulley 56, the wire material 12 is wound over the illustrated path with respect to the tension roller 70 via the pulleys 62, 64, 68.

The wire material 12 is drawn out further from the tension roller 70 via the tension measuring unit 49 and up to the coil producing section 20, where the wire material 12 is stopped at the winding frame 30. Pulling out and threading of the wire material 12 in this manner may be carried out automatically by an automated machine, or may be performed manually.

Next, the tension roller 70 is moved by the linear motor 76 to a substantially intermediate position of the slit 80. Consequently, the tension roller 70 is moved to an active side from the standby position, whereby tension is applied to the wire material 12. As a result of the tension roller 70 being arranged at a substantially intermediate position of the slit 80, the tension adjusting allowance with respect to the wire material 12 can be made larger.

In the foregoing manner, the wire material 12 is trained in a state of having a predetermined tension from the supply bobbin 14 up to the stacked steel plate 24 (winding frame 30).

Next, the winding process is initiated. When rotation of the bobbin motor 15 is started, the wire material 12 is fed out from the supply bobbin 14, whereas the spindle 42 of the coil producing section 20 is rotated by the spindle motor 48, whereupon the wire material 12 is taken up and wound onto the winding frame 30 (see FIG. 2), thereby producing the coil 18. At this time, in the tensioning mechanism 22, the linear motor 76 is subjected to feedback control (PID control) in real time under operation of the controller 23, so that the tension of the wire material 12 is maintained at a suitable value, and the tension that is measured by the tension measuring unit 49 acquires a suitable tension value.

The structure and operation of the controller 23 that effects the wire winding process shall be explained below.

First, explanations shall be made concerning the structure and basic operations of the controller 23. The controller 23 is constituted by a computer and a digital signal processor (DSP), etc. Based on various inputs thereto, by execution of programs in a CPU, which are stored in a memory such as a ROM or the like, the controller 23 operates as a function realizing unit (function realizing means) for implementing various functions.

Figure 4:
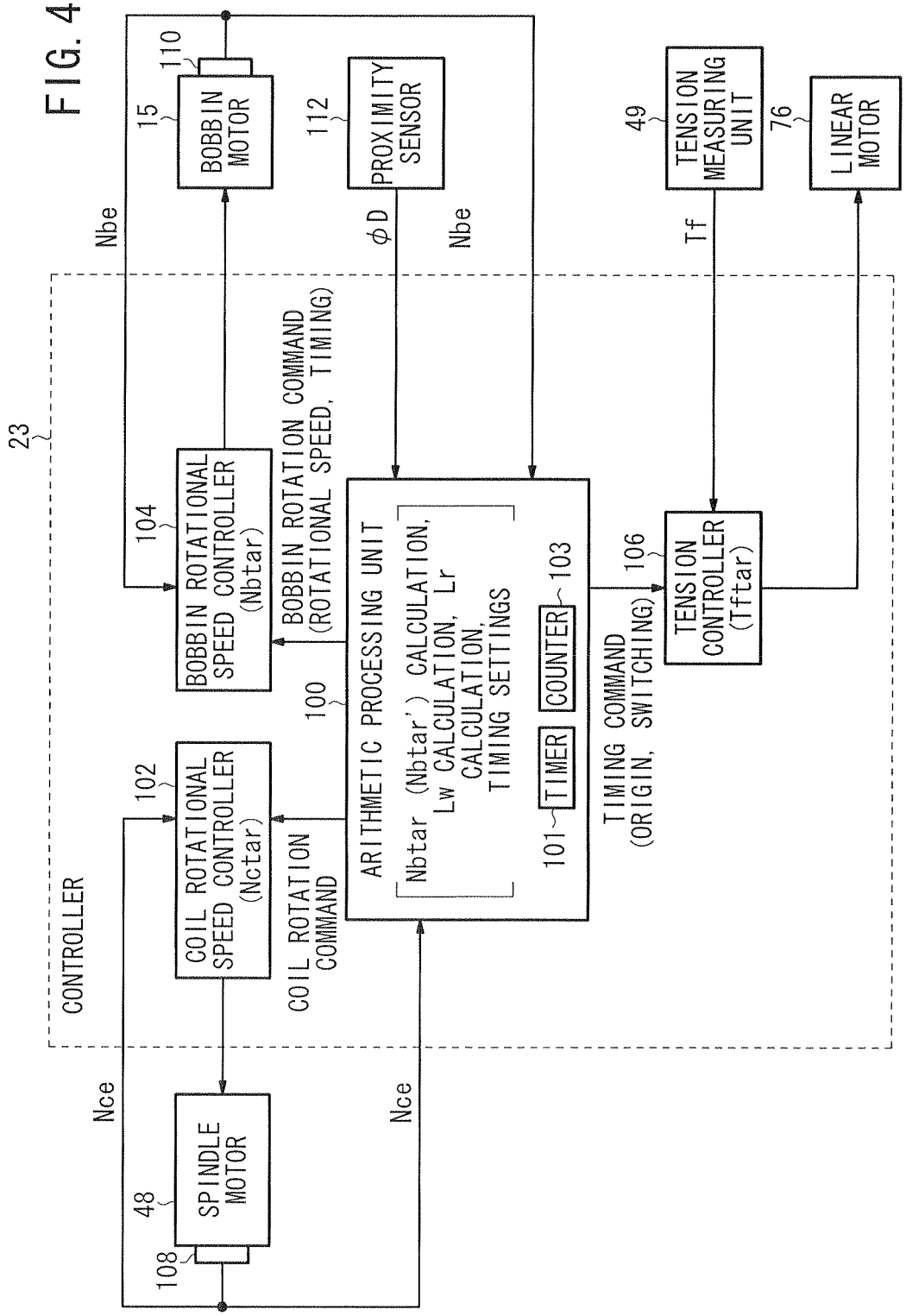
FIG. 4 is a functional block diagram of a controller of the wire winding device.

As shown in FIG. 4, in the present embodiment, the controller 23 functions as an arithmetic processing unit 100, a coil rotational speed controller 102 that receives coil (winding frame or core) rotation commands from the arithmetic processing unit 100, a bobbin rotational speed controller 104 that receives bobbin rotation commands (rotational speed and timing) from the arithmetic processing unit 100, and a tension controller 106 that receives timing commands (origin, layer switching) from the arithmetic processing unit 100.

The coil rotational speed controller 102 receives a coil rotation command from the arithmetic processing unit 100, and by rotating the spindle motor 48 at a coil rotational target value Nctar (in the present embodiment, a constant value of 1000 rpm for example), rotates the winding frame 30 to thereby produce the coil 18.

An encoder 108 is provided on the spindle motor 48. By supplying the coil actual rotational speed Nce, which is detected by the encoder 108, to the coil rotational speed controller 102, the coil rotational speed controller 102 performs a feedback control such that the coil actual rotational speed Nce of the spindle motor 48 is maintained at the coil rotational speed target value Nctar. The coil actual rotational speed Nce also is supplied to the arithmetic processing unit 100. Further, in actual practice, the coil actual rotational speed Nce is calculated on the basis of pulses from the encoder 108, which are counted by the coil rotational speed controller 102 and the arithmetic processing unit 100.

On the other hand, the bobbin rotational speed controller 104 receives a bobbin rotation command (rotational speed and timing) from the arithmetic processing unit 100, and more specifically, receives from the arithmetic processing unit 100 a bobbin rotational speed target value Nbtar, which differs for each layer of the coil 18, together with a switching timing therefor, and rotates the bobbin motor 15.

An encoder 110 is provided on the bobbin motor 15. By supplying the bobbin actual rotational speed Nbe, which is detected by the encoder 110, to the bobbin rotational speed controller 104, the bobbin rotational speed controller 104 performs a feedback control such that the bobbin actual rotational speed Nbe of the bobbin motor 15 is maintained at the bobbin rotational speed target value Nbtar. The bobbin actual rotational speed Nbe also is supplied to the arithmetic processing unit 100. Further, in actual practice, the bobbin actual rotational speed Nbe is calculated on the basis of pulses from the encoder 110, which are counted by the bobbin rotational speed controller 104 and the arithmetic processing unit 100.

The bobbin outside diameter φD (see FIG. 1) of the supply bobbin 14 becomes reduced upon feed-out of the wire material 12 from the supply bobbin 14. The bobbin outside diameter φD is detected (measured) by a proximity sensor 112, which is arranged in the vicinity of the supply bobbin 14, and is supplied to the arithmetic processing unit 100.

Because the bobbin outside diameter φD is extremely large compared with the outside diameter φd of the coil 18, during formation of a single coil 18 (wire material multi-layer arrayed coil), the bobbin outside diameter φD may be considered as a constant (φD=constant).

In FIG. 4, a tension (stress) detection value Tf[N], which is measured by the tension measuring unit 49, is supplied to the tension controller 106. The tension controller 106, responsive to a layer switching (switching of winding layers of the coil 18) timing command from the arithmetic processing unit 100, drives the linear motor 76, moves the tension roller 70, and performs tension feedback control, such that the tension detection value Tf coincides with a tension target value Tftar, which is a suitable value (predetermined value) regardless of layer switching.

Figure 5:
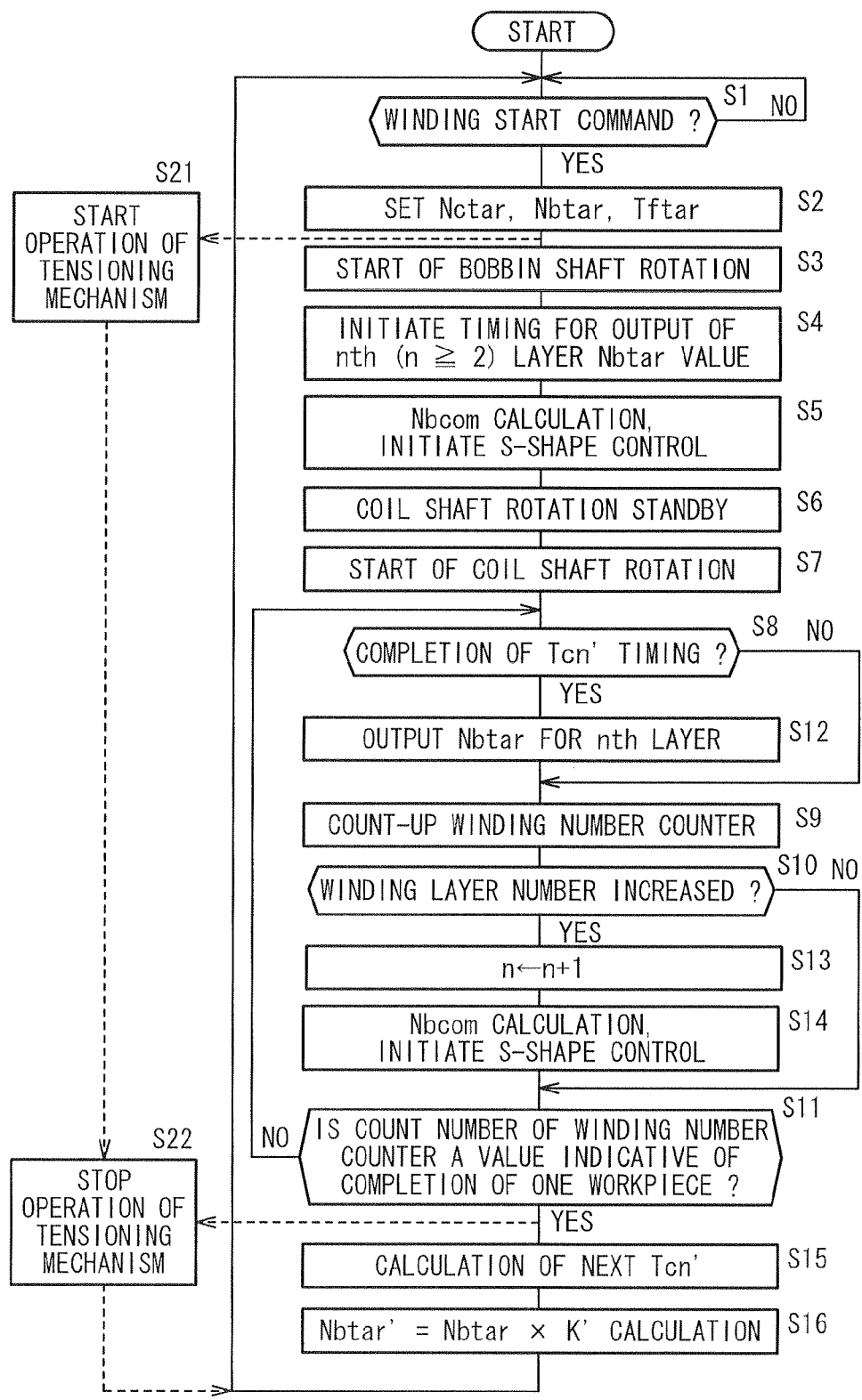
FIG. 5 is a flowchart in which operations of the controller of the wire winding device are explained.

Next, an explanation shall be made with reference to the flowchart of FIG. 5 concerning detailed operations of the controller 23, which is constructed and operates basically as described above.

In step S1, the arithmetic processing unit 100 of the controller 23 receives a winding start command from a non-illustrated upper level apparatus or an input device. In step S2, the arithmetic processing unit 100 sends commands to perform initial settings in the coil rotational speed controller 102, the bobbin rotational speed controller 104, and the tension controller 106.

By the initial settings made in step S2, in the coil rotational speed controller 102, the coil rotational speed target value Nctar is set in an internal setting memory thereof, and in the tension controller 106, the tension target value Tftar is set in an internal setting memory thereof. The initial value of the bobbin rotational speed target value Nbtar (bobbin rotational speed target value Nbtar for a first layer of the coil 18) is set in a setting memory of the bobbin rotational speed controller 104 from the arithmetic processing unit 100.

In this case, the bobbin rotational speed target value Nbtar is calculated in the arithmetic processing unit 100 from the coil rotational speed target value Nctar, and from a ratio between the outer diameter φd (first layer), which is a circular diameter converted value of the outer circumferential (rectangular) length of the winding frame 30, which is stored beforehand, and the bobbin outer diameter φD, which is measured by the proximity sensor 112 (Nbtar=Nctar×φd/φD).

Before describing the processes of step S3 and thereafter, in order that the significance of the method according to the present embodiment is well understood, explanations shall be made concerning main features (characteristics) of the process by the flowchart of FIG. 5, while also describing disadvantages that result in a process according to a comparative example.

Figure 6A:
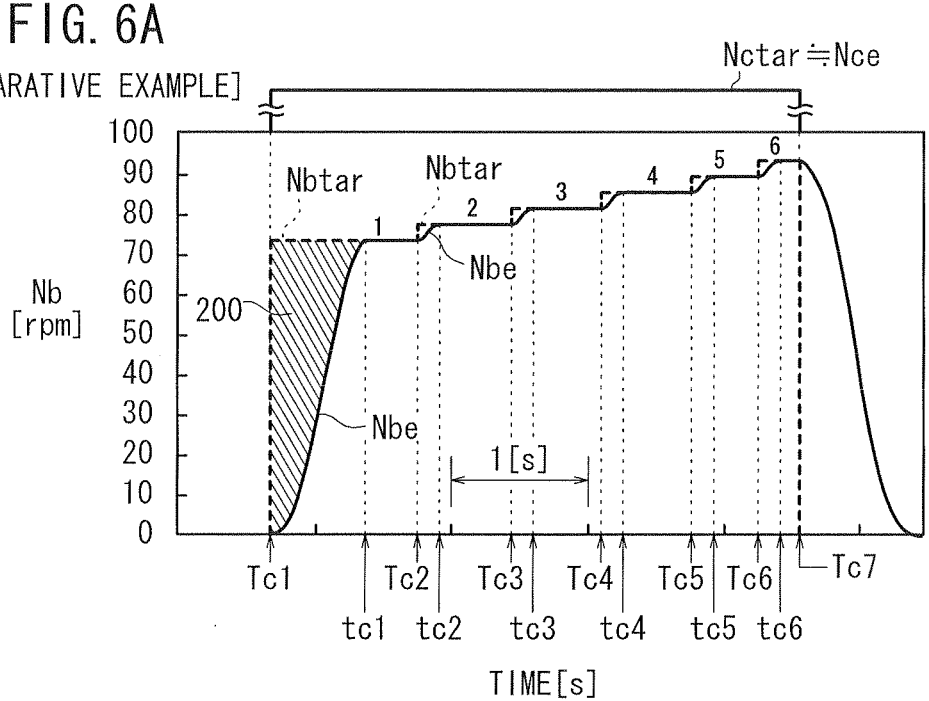
FIG. 6A is an explanatory drawing of the relationship of the bobbin rotational speed target value and an actual bobbin rotational speed, with respect to start of rotation timing of the bobbin according to a comparative example.

FIG. 6A shows the relationship of the bobbin rotational speed value Nb [rpm] and passage of time according to a comparative example. On the time axis, one graduation interval thereof corresponds to one second [s].

At time Tc1, when the command value of the bobbin rotational speed target value Nbtar is output to the bobbin motor 15, due to the inertia of the supply bobbin 14, the bobbin actual rotational speed Nbe rises in rotational speed while being delayed along an S-shaped curve, until at time tc1, the bobbin rotational speed target value Nbtar and the bobbin actual rotational speed Nbe coincide with each other.

On the other hand, at time Tc1, although the command value of the coil rotational speed target value Nctar is output simultaneously to the spindle motor 48, because the inertia of the spindle 42 is small, roughly from time Tc1, the coil actual rotational speed Nce coincides with the coil rotational speed target value Nctar (refer to the upper side in FIG. 6A).

The interval from time Tc1 to time Tc2 represents a time over which the winding of the first layer (bottommost layer) of the coil 18 is wound on the winding frame 30.

Similarly, when the second layer bobbin rotational speed target value Nbtar of the coil 18 is output at time Tc2 (as shown in FIG. 6A, the second layer bobbin rotational speed target value Nbtar increases corresponding to a portion by which the winding take-up amount increases per fixed unit of time as the outside diameter φd of the coil 18 becomes greater), in this case as well, due to the inertia of the supply bobbin 14, the bobbin actual rotational speed Nbe rises in rotational speed while being delayed along an S-shaped curve, at time tc2, the bobbin rotational speed target value Nbtar and the bobbin actual rotational speed Nbe coincide with each other.

Henceforth, transitions are carried out similarly until reaching a winding termination time Tc7 of the sixth layer, which is the outermost layer of a single coil 18.

Figure 7A:
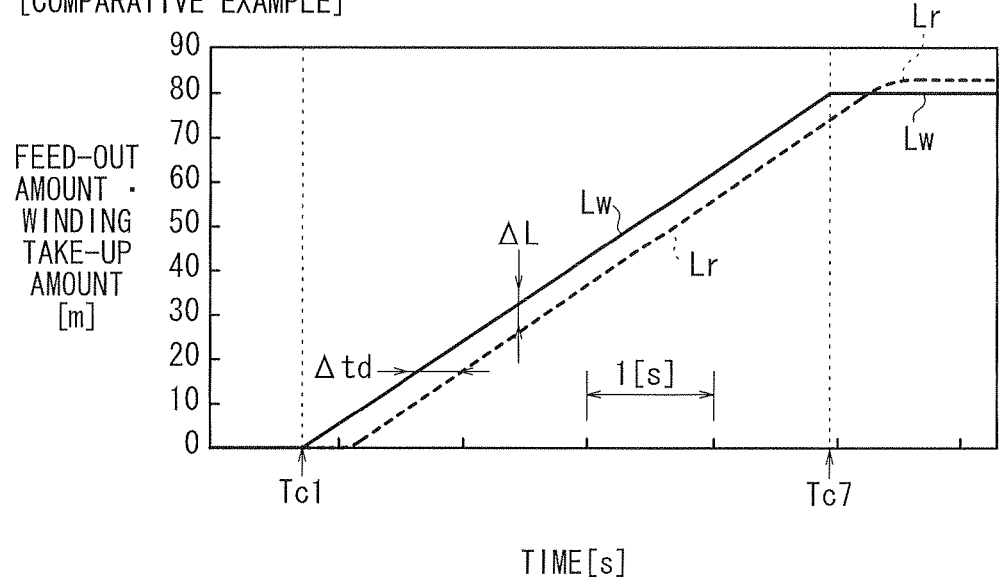
FIG. 7A is an explanatory drawing showing a difference in a coil winding take-up amount and a bobbin feed-out amount according to a comparative example.

In this case, according to the comparative example shown in FIG. 7A, as indicated by the relationship between the feed-out amount Lr of the wire material 12 from the supply bobbin 14 and the winding take-up amount Lw on the winding frame 30, the feed-out amount Lr [m] from the supply bobbin 14 with respect to the winding take-up amount Lw [m] of the coil 18 becomes the same value at a point in time after passage of a delay time Δtd {i.e., a delay time of (rotation of) the bobbin shaft with respect to (rotation of) the coil shaft, also referred to simply as a bobbin shaft delay time}.

However, with the wire winding plan according to the comparative example shown in FIGS. 6A and 7A, in order to perform rotational control on the spindle motor 48 and the bobbin motor 15, because the difference in inertia and the difference in outer diameters φd, φD of the coil 18 and the supply bobbin 14 are large, an excessive load is imposed on the tensioning mechanism. More specifically, the tensioning mechanism is required to incorporate therein a non-illustrated brake roller or the like, and thus becomes larger in scale and more complex in structure.

The processing that was described above provides an explanation of processing by the comparative example and the disadvantages thereof.

In the processing of the comparative example, the inventors of the present application considered the fact that the delay time Δtd pertaining to the difference ΔL between the winding take-up amount Lw of the coil 18 and the feed-out amount Lr of the supply bobbin 14 shown in FIG. 7A corresponds to the integral value of the portion shown in hatching in FIG. 6A, formed by the bobbin rotational speed target value Nbtar, which is a stepwise command, and the bobbin actual rotational speed Nbe, which is in the form of an S-shaped curve.

Figure 6B:
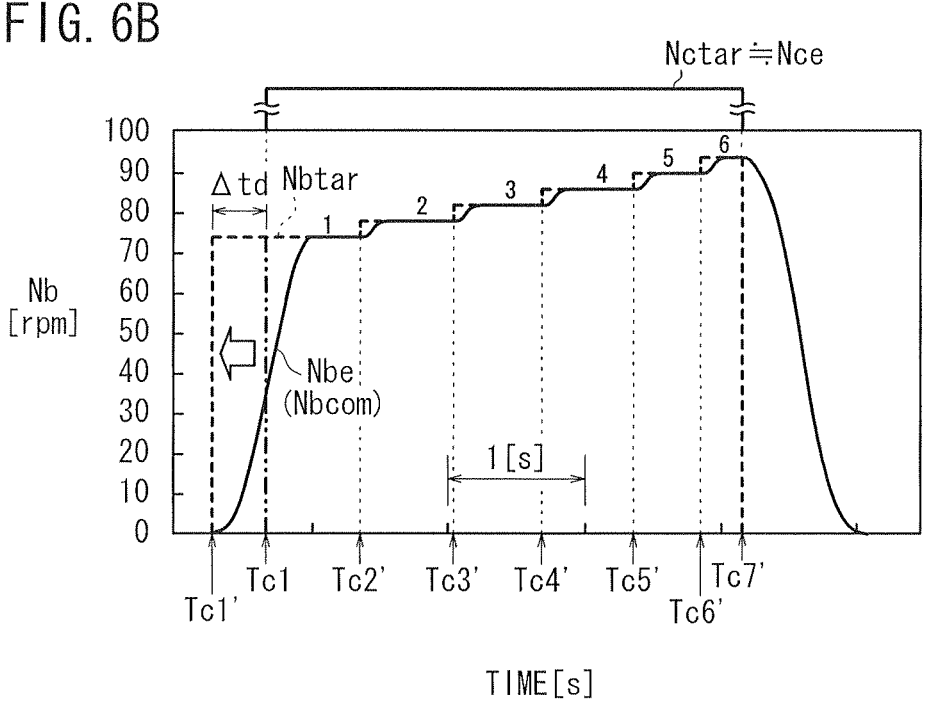
FIG. 6B is an explanatory drawing of the relationship of the bobbin rotational speed target value and an actual bobbin rotational speed, with respect to start of rotation timing of the bobbin according to the present embodiment.

Consequently, according to the present embodiment, as shown in FIG. 6B, at a time Tot that arises before the rotation start time Tc1 of the spindle motor 48, the first layer bobbin rotational speed target value Nbtar command is sent from the bobbin rotational speed controller 104 to the bobbin motor 15.

The first layer rotation start time Tc1' of the bobbin motor 15, which arises before the rotation start time Tc1 of the spindle motor 48 (bearing in mind that this time is the same as the time shown in FIG. 6A), can be determined by the following equation (1), taking into consideration the time tc1 shown in FIG. 6A, at which the first layer bobbin rotational speed target value Nbtar and the first layer actual rotational speed Nbe coincide with each other.

$$Tc1' = Tc1 - \Delta td \approx Tc1 - (tc1 - Tc1)/2 \quad (1)$$

Similarly, it is understood that the command time Tc2' of the second layer bobbin rotational speed target value Nbtar can be determined from the following equation (2).

$$Tc2' = Tc2 - \Delta td - \text{second layer delay time portion} \approx \quad (2)$$
$$Tc2 - \Delta td - (tc2 - Tc2)/2$$

In general, after the second layer, it is understood that the command time Tcn' of the nth layer bobbin rotational speed target value Nbtar can be determined from the following equation (3).

$$Tcn' = \quad (3)$$
$$Tcn - \Delta td - \text{cumulative value of delay times up to the nth layer} \approx$$
$$Tcn - \Delta td - \Sigma(tcn - Tcn)/2$$

In the above equation (3), the value of n is such that n≥2.

Figure 7B:
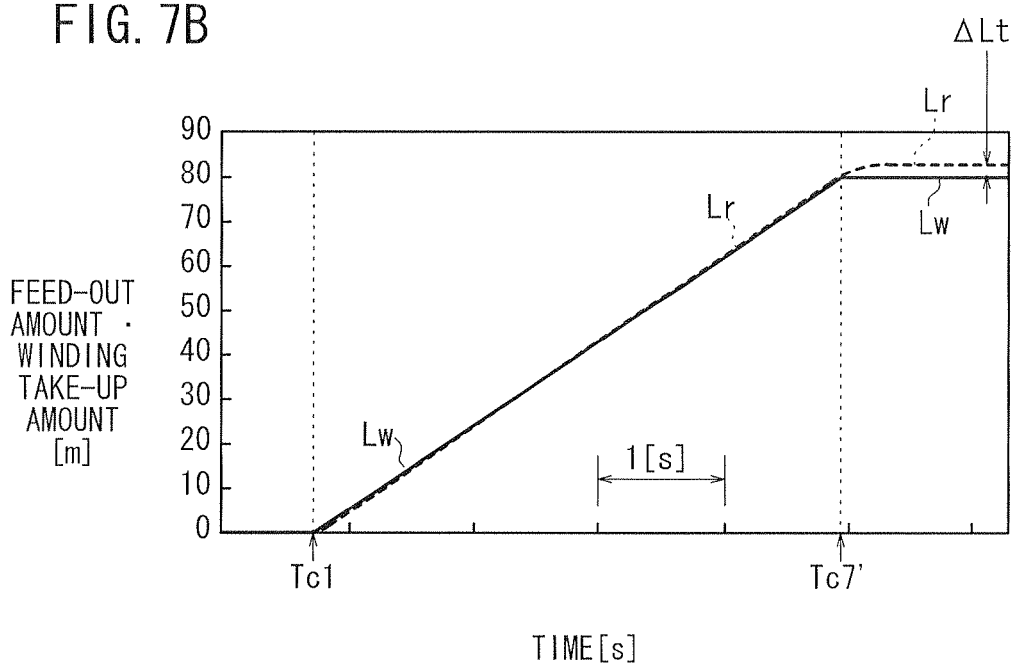
FIG. 7B is an explanatory drawing showing a difference in a coil winding take-up amount and a bobbin feed-out amount according to the present embodiment.

In this manner, in the wire winding step at the next time, at each of the layers of the coil 18, by controlling the rotation start time of the bobbin motor 15 so as to occur earlier by a time that is approximately ½ of the bobbin delay time Δtd {i.e., for the first layer, a time of Δtd/2, and for the second and subsequent layers, a time calculated by the above equation (3), which in addition to the time Δtd/2, further takes into consideration a delay time caused by inertia of the supply bobbin 14, based on the difference in rotational speeds between the inner layer (a previously wound layer) and the outer layer (a layer to be wound from now)}, as shown in FIG. 7B, the winding take-up amount Lw of the coil 18 at each of the winding start times Tc1, and Tc2' through Tc6', from the first layer winding start time Tc1 of the coil 18 of the spindle motor 48 to the sixth layer winding start time Tc6' of the coil 18, and the feed-out amount Lr of the supply bobbin 14 can be made to coincide substantially with each other moment by moment.

Owing thereto, according to the present embodiment, the tensioning mechanism 22 having a simple structure that does not utilize a braking roller or the like can be adopted, in which the linear motor 76 and the tension roller 70 shown in FIG. 1 are used.

The time Tc1' that arises before the rotation start time Tc1 of the spindle motor 48 depends on the delay time Δtd. Because this delay time Δtd depends on the bobbin rotational speed Nb and the inertia of the supply bobbin 14, a chart (table, map) of times Tc1' is created, in which the bobbin rotational speed Nb and the bobbin outside diameter φD are taken as variables, and the delay time Δtd is defined as a function thereof {Δtd=f(Nb, φD)}. The chart (table, map) is stored beforehand in a memory (ROM) of the arithmetic processing unit 100.

As shown in FIG. 7B, although by carrying out the winding take-up and feed-out control according to the novel plan described above, the difference ΔL (see FIG. 7A) between the winding take-up amount Lw and the feed-out amount Lr can be eliminated, even if the winding take-up and feed-out control according to the novel plan is performed, a total feed-out amount error ΔLt [m], defined as a differential between the winding take-up amount Lw and the feed-out amount Lr after the time Tc7' in FIG. 7B when the control is terminated, is generated. Next, a plan for zeroing out (eliminating) such a total feed-out amount error ΔLt shall be described.

Figure 8:
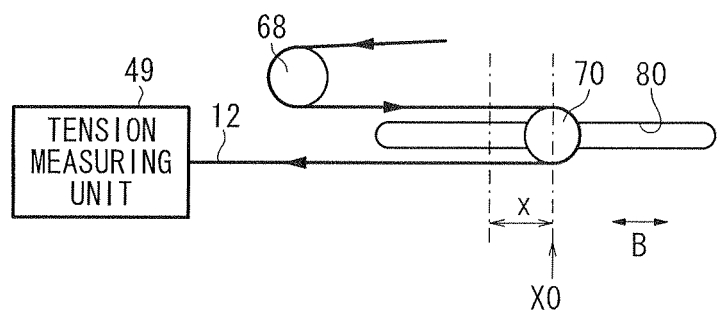
FIG. 8 is an explanatory drawing of a positional deviation amount of a tensioning mechanism.

As shown in FIG. 8, it is understood that the total feed-out amount error ΔLt [m] is two times the shift amount x in position from a reference position X0 in the direction of the arrow B of the tension roller 70.

$$\Delta Lt = 2 \times x \quad (4)$$

The shift amount x in position is generated by the tensioning mechanism 22 for the purpose of applying a suitable tension to the wire material 12, and in general, zeroing out the same is extremely difficult in terms of cost.

Consequently, for zeroing out the total feed-out amount error ΔLt [m] while the shift amount x in position is permitted, a variable (changeable) bobbin rotational speed target value Nbtar is corrected at a next time of winding. Since the coil rotational speed Nc of the spindle motor 48 is constant, the coil rotational speed Nc is not corrected.

In this case, a feed-out amount correction coefficient K' at a next time of winding is calculated from a present feed-out amount correction coefficient K, according to the following equation (5).

$$K' = K \times (\Delta Lt - L)/L \quad (5)$$

where

K': a feed-out amount correction coefficient at a next time of winding

K: a feed-out amount correction coefficient at a present time of winding

ΔLt: a total feed-out amount error at a present time of winding

L: a reference total feed-out amount

Using the feed-out amount correction coefficient K', the next bobbin rotational frequency target value Nbtar' can be corrected with respect to the present bobbin rotational frequency target value Nbtar, according to the following equation (6).

$$Nbtar' = Nbtar \times K' = Nbtar \times K \times (\Delta Lt - L)/L \quad (6)$$

Herein, the reference total feed-out amount L can be calculated from the following equation (7).

$$L = \Sigma \pi D \times Nbe \times \Delta t \quad (7)$$

The range of the summation Σ is a range from the winding start time t=0 to the winding time tend, over which the feed-out length is calculated per each control processing time interval Δt. The winding time tend is the time it takes to wind a single coil 18 (i.e., the time interval from time Tc1' to time Tc7' shown in FIG. 6B), and the number of calculation times is tend/Δt.

In equation (7), π is a circle ratio, D is the bobbin outer diameter, and Nbe is the bobbin actual rotational speed. Δt is a control processing time interval, such that when a sequencer using a ladder program is modeled and described, Δt corresponds to a so-called ladder execution interval. For example, Δt may be selected so that Δt=0.004 [s].

Figure 9:
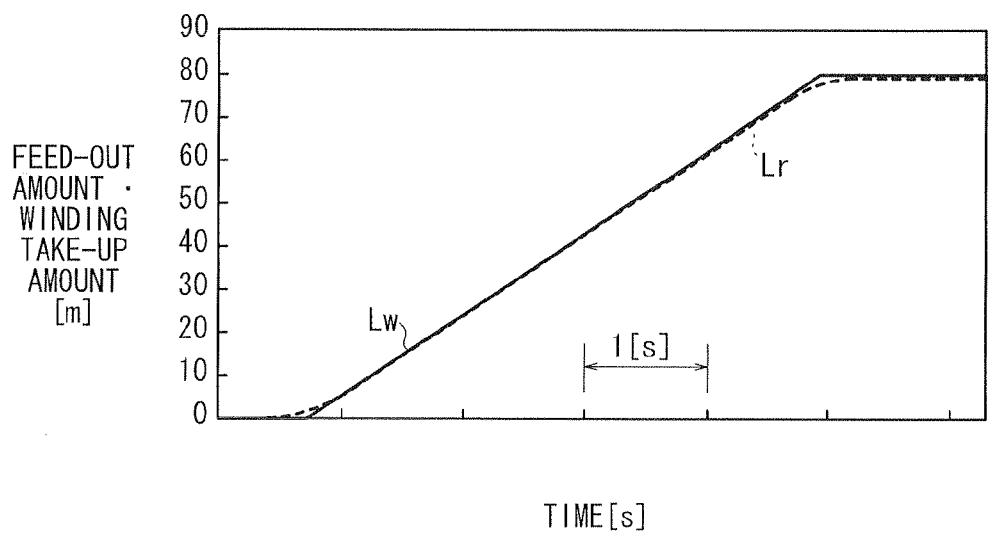
FIG. 9 is an explanatory drawing showing elimination of a difference in a total coil winding take-up amount and a total bobbin feed-out amount.

In this manner, when at the next time, the bobbin rotational speed target value Nbtar' is corrected, as shown in FIG. 9, the total feed-out amount error ΔLt between the winding take-up amount Lw (actual line) of the coil 18 and the feed-out amount Lr (dashed line) of the supply bobbin 14 can be reduced substantially to zero.

The above explanations are of essential features of a process according to the flowchart, which shall now be described in further detail, and which is shown in FIG. 4 pertaining to the present embodiment, in which explanations have been made in contrast to disadvantages of a process according to a comparative example.

Henceforth, in step S3, by initiating rotation of the bobbin motor 15 in accordance with an initial value of the bobbin rotational speed target value Nbtar, which was set in step S2, rotation of the supply bobbin 14 is started (also referred to as start of bobbin shaft rotation).

Next, simultaneously with the process of step S3 (i.e., at the time of start of bobbin shaft rotation), in step S4, the arithmetic processing unit 100 initiates, by means of a timer 101 (timer section for determining output times of second and subsequent layer bobbin rotational speed target value Nbtar commands), a timing for the purpose of determining output times Tcn' {the above-mentioned equation (3)} of commands for the bobbin rotational speed target value Nbtar for second and subsequent layers, in order to wind n layers (where n is of values from 2 to 6) of the coil 18.

Further, simultaneously with the process of step S3 (i.e., at the time of start of bobbin shaft rotation), in step S5, a bobbin rotational speed command value Nbcom is calculated by means of the bobbin rotational speed target value Nbtar and a so-called S-shaped curve acceleration/deceleration control for absorbing the bobbin shaft inertia, and rotation control is initiated. By carrying out control in accordance with the bobbin rotational speed command value Nbcom, as shown in FIG. 6B, the bobbin rotational speed command value Nbcom becomes substantially equivalent to the bobbin actual rotational speed Nbe.

Further, simultaneously with the process of step S3, in step S6, starting of rotation of the spindle motor 48 is placed on standby (also referred to as placing on standby the start of rotation of the coil shaft, or coil shaft rotation standby). The coil shaft rotation start standby time is equivalent to the bobbin delay time Δtd=Tcl−Tcl' (see FIGS. 6A and 7A).

Next, in step S7, rotation of the spindle motor 48 is initiated (also referred to as start of coil shaft rotation) at time Tc1 (see FIG. 6B) after passage of the bobbin delay time Δtd according to the timer 101, whereupon winding of the wire material 12 of the first layer of the coil 18 on the winding frame 30 is started.

Next, in step S8, a judgment is made as to whether timekeeping by the timer 101, until the output time Tcn' of the bobbin rotational speed target value command Nbtar of the second and subsequent layers, is completed. In the case that such timekeeping is not completed, in step S9, the arithmetic processing unit 100 advances (counts up) the count of a winding number counter 103 (counter) from the coil actual rotational speed Nce (in effect, pulses) output from the encoder 108.

Next, in step S10, from the count value of the winding number counter 103, it is determined whether or not the winding number has increased. Such increments in the winding number are recorded beforehand as a table or a map in the coil rotational speed controller 102 and in the arithmetic processing unit 100. The arithmetic processing unit 100 makes such determinations with reference to the table (map) in which until the number of windings of the coil shaft is y1 times, a first layer is determined, until the number of windings of the coil shaft is y2 times, a second layer is determined, . . . , and until the number of windings of the coil shaft is yn times, an nth layer is determined.

Next, in step S11, it is determined whether or not the count value of the winding number counter 103 is equivalent to one coil 18, or more specifically, whether the count value has obtained a value indicative of completion of one workpiece.

If a value indicative of completion of one workpiece has not been reached, then step S8 is returned to. When the timing by the timer 101 reaches the output time Tcn' of commands for the second and subsequent layer bobbin rotational speed target value Nbtar (determined by equation (3) above), then in step S12, commands for the second and subsequent layer bobbin rotational speed target values Nbtar are output, whereupon the bobbin motor 15 is rotated through the bobbin rotational speed controller 104.

In step S9, furthermore, the winding number counter 103 is incremented (counted up), and in step S10, when it is determined that the winding number has increased, then in step S13, the layer number n is incremented by one layer (n←n+1). Then, in step S14, similar to step S5, a bobbin rotational speed command value Nbcom is calculated by means of the bobbin rotational speed target value Nbtar and a so-called S-shaped curve acceleration/deceleration control for absorbing the bobbin shaft inertia, and rotation control, i.e., in this case, a rotation control for the second and subsequent layers, is initiated.

Control is repeated in the foregoing manner, and in step S11, when the count number of the winding number counter 103 reaches a value indicative of completion of one workpiece, then in step S15, the bobbin diameter φD is measured by the proximity sensor 112, and with reference to the table, a rotation start time Tcn' of the bobbin motor 15 for the first layer, for producing a next new coil 18, is calculated and stored in memory, which is then read out at step S3 upon receipt of a winding start command, from step S1 in the next cycle.

Further, in step S16, the feed-out amount correction coefficient K' at a next time of winding is calculated by the aforementioned equation (5) from the present feed-out amount correction coefficient K. Using the calculated feed-out amount correction coefficient K', a next bobbin rotational speed target value Nbtar' is corrected and calculated by the aforementioned equation (6) with respect to the present bobbin rotational speed target value Nbtar, which, in step S2 of the next cycle, is set in the setting memory of the bobbin rotational speed controller 104.

Moreover, when rotation of the bobbin shaft (bobbin motor 15 and the supply bobbin 14) is started in step S3, operation of the tensioning mechanism 22 is initiated in step S21 by a start command from the arithmetic processing unit 100, whereupon the tension roller 70 is subjected to a PID feedback control through the linear motor 76, such that the tension value Tf measured by the tension measuring unit 49 is maintained at a suitable value (i.e., the tension target value Tftar). Concerning operation of the tensioning mechanism 22, when winding of one coil 18 is completed (i.e., upon conclusion of step S11), a stop command is output with respect to the tension controller 106 from the arithmetic processing unit 100, whereupon, in step S22, the tension controller 106 halts operation of the linear motor 76 that governs the tensioning mechanism 22.

As described above, the aforementioned wire winding device 10 according to the present embodiment is equipped with the bobbin motor 15 as a bobbin rotating mechanism, which rotates the supply bobbin 14 that supplies the wire material 12, the spindle motor 48 as a coil rotating mechanism, which produces the coil 18 by winding the wire material 12 supplied from the supply bobbin 14 while arraying the wire material 12 on the winding frame 30 via the nozzle 44, and the controller 23 for controlling rotational speeds Nb, Nc of the bobbin motor 15 and the spindle motor 48.

The controller 23 comprises the coil rotational speed controller 102 as a coil rotational speed setting unit for setting the constant speed coil rotational speed target value Nctar, the arithmetic processing unit 100 as a bobbin rotational speed target value calculating unit for calculating the bobbin rotational speed target value Nbtar based on the coil rotational speed target value Nctar, the coil diameter φd, and the supply bobbin diameter φD, the arithmetic processing unit 100 as a winding take-up amount calculating unit for calculating a winding take-up amount Lw of the wire material 12, which is wound up on the winding frame 30 as a coil 18, from the coil actual winding speed Nce of the coil 18 and the coil diameter φD, the arithmetic processing unit 100 as a feed-out amount calculating unit for calculating a feed-out amount Lr of the wire material 12, which is fed out from the supply bobbin 14, from the bobbin actual rotational speed Nbe from the bobbin motor 15 that rotates the supply bobbin 14 and from the bobbin diameter φD, and the arithmetic processing unit 100 as a timing setting means for setting, in the bobbin motor 15 via the bobbin rotational speed controller 104, a timing (Tc1', Tc2', ..., Tc6' shown in FIG. 6B) at which rotation of the bobbin motor 15 is started at the bobbin rotational speed target value Nbtar, based on a feed-out delay time Δtd of the supply bobbin 14, which is calculated from the calculated winding take-up amount Lw and the calculated feed-out amount Lr.

More specifically, based on the difference between the winding take-up amount Lw of the wire material 12, which is taken up on the side of the winding frame 30, and the feed-out amount Lr of the wire material 12, which is fed out from the supply bobbin 14, because the rotation (rotational speed, timing of change of the rotational speed) of the supply bobbin 14 with respect to rotation of the coil 18 is controlled such that the winding take-up amount Lw of the wire material 12 of the coil 18 and the feed-out amount Lr of the wire material 12 of the supply bobbin 14 are kept in agreement moment by moment, even in the case that the inertia and diameter of the coil 18 and the supply bobbin 14 differ greatly, variations in tension can be suppressed with high accuracy.

For example, the rotational speed of the coil is fixed at a value on the order of 1000 rpm, and the rotational speed of the bobbin is maintained within a range of 1/10 to 1/20 thereof (coil rotational speed>>bobbin rotational speed). According to the present invention, the coil 18 having the multi-layered wire material 12 can be produced (mass produced) within a short time while variations in tension are suppressed with high accuracy.

In this case, the controller 23 calculates a bobbin rotational speed target value Nbtar for each of respective layers, corresponding to a number of layers of the coil 18 that is wound on the winding frame 30, and sets a timing for starting rotation of the bobbin, or for switching the rotational speed for the respective layers. When carried out in this manner, in a regular winding coil such as the coil 18, responsive to the winding layers (number of layers of the coil 18), because control is performed corresponding to the outer diameter φd of the coil 18 becoming larger and as the winding take-up amount per each turn of the coil 18 increases, and so that the actual rotational speed Nbe of the bobbin becomes greater, variations in tension can be suppressed with higher accuracy.

Further, the tensioning mechanism 22 is provided over which the wire material 12 is trained, for alleviating variations in tension that occur when the wire material 12 is wound on the winding frame 30, the tensioning mechanism 22 being disposed in a wire material feed-out path between the supply bobbin 14 and the winding frame 30. However, according to the present embodiment, because the difference between the winding take-up amount (coil take-up amount) Lw of the wire material 12 by the coil 18 and the feed-out amount (bobbin feed-out amount) Lr of the wire material 12 from the supply bobbin 14 is made small, the displacement amount x of the tension roller 70 that is a pulley of the tensioning mechanism 22 also is made small, whereby the tensioning mechanism 22 can be simplified and made smaller in scale. As a result, adoption of a large scale and complex mechanism using a brake roller mechanism for suppressing tension variations is unnecessary, and, for example, only the tensioning mechanism 22, which is formed by means of a linear tensioner made up of the linear motor 76 according to the present embodiment, which is simple in structure, can be utilized.

In this case, by equipping the arithmetic processing unit 100 of the controller 23 further with a bobbin rotational speed target value correcting section for calculating a next bobbin rotational speed target value Nbtar' based on a shift amount x in position of the linear motor 76 and a standard total feed-out length L, which is a total feed-out amount of the wire material at a present time of winding, such that a total feed-out amount error ΔLt, defined as a deviation between a coil winding take-up amount Lw and a bobbin feed-out amount Lr at a next time of winding, vanishes, the total feed-out amount error ΔLt, which represents the cumulative winding deviation in a single coil, can be eliminated.

The wire winding device according to the present invention is not limited to the above-described embodiment, and it is a matter of course that various other structures could be adopted without deviating from the essence and scope of the invention.

The invention claimed is:

1. A wire winding device comprising:
   a bobbin rotating mechanism for feeding out a wire material by rotating a supply bobbin that supplies the wire material;
   a coil rotating mechanism for taking up and winding the wire material supplied from the supply bobbin via a nozzle while arraying the wire material on a winding frame to thereby produce a coil; and
   a controller for controlling rotational speeds of the bobbin rotating mechanism and the coil rotating mechanism,
   wherein the controller comprises:
   a coil rotational speed setting unit for setting a coil rotational speed of a constant velocity for the coil rotating mechanism;
   a bobbin rotational speed target value calculating unit for calculating a bobbin rotational speed target value based on the coil rotational speed, a coil diameter, and a supply bobbin diameter;
   a winding take-up amount calculating unit for calculating a coil winding take-up amount of the wire material that is wound on the winding frame as the coil, from an actual rotational speed of the coil and the coil diameter;
   a feed-out amount calculating unit for calculating a bobbin feed-out amount of the wire material that is fed from the supply bobbin, from an actual rotational speed of the supply bobbin and the bobbin diameter; and
   timing setting means for setting a timing at which rotation of the bobbin rotating mechanism is started at the bobbin rotational speed target value, which is earlier than a timing at which rotation of the coil rotating mechanism is started, based on a feed-out delay time of the supply bobbin, which is calculated from the calculated winding take-up amount and the calculated feed-out amount.

2. The wire winding device according to claim 1, wherein the coil includes a plurality of layers of the wire material, and the controller calculates the bobbin rotational speed target value for each of respective layers of the wire material, corresponding to a number of layers of the wire material that is wound on the winding frame, and sets the timing for starting rotation of the bobbin rotating mechanism or for switching the rotational speed of the bobbin, for the respective layers.

3. The wire winding device according to claim 2, further comprising a tensioning mechanism over which the wire material is trained, for alleviating variations in tension that occur when the wire material is wound on the winding frame, the tensioning mechanism being disposed in a wire material feed-out path between the supply bobbin and the winding frame.

4. The wire winding device according to claim 3, wherein:
the tensioning mechanism is a linear tensioner; and
the controller further comprises a bobbin rotational speed target value correcting unit for calculating a next bobbin rotational speed target value, based on a shift amount in position of the linear tensioner and the total feed-out amount of the wire material at a present time of winding, such that a total feed-out amount error, defined as a deviation between a next coil winding take-up amount and a next bobbin feed-out amount at a next time of winding, vanishes.

5. The wire winding device according to claim 1, further comprising a tensioning mechanism over which the wire material is trained, for alleviating variations in tension that occur when the wire material is wound on the winding frame, the tensioning mechanism being disposed in a wire material feed-out path between the supply bobbin and the winding frame.

6. The wire winding device according to claim 5, wherein:
the tensioning mechanism is a linear tensioner; and
the controller further comprises a bobbin rotational speed target value correcting unit for calculating a next bobbin rotational speed target value, based on a shift amount in position of the linear tensioner and the total feed-out amount of the wire material at a present time of winding, such that a total feed-out amount error, defined as a deviation between a next coil winding take-up amount and a next bobbin feed-out amount at a next time of winding, vanishes.

* * * * *